(12) United States Patent
Masuda et al.

(10) Patent No.: US 8,486,531 B2
(45) Date of Patent: Jul. 16, 2013

(54) THERMALLY EXPANDED MICROSPHERES AND A PROCESS FOR PRODUCING THE SAME

(75) Inventors: Toshiaki Masuda, Yao (JP); Ichiro Takahara, Yao (JP); Kenichi Kitano, Yao (JP); Katsushi Miki, Yao (JP); Takeshi Inohara, Yao (JP); Takayuki Aoki, Yao (JP)

(73) Assignee: Matsumoto Yushi-Seiyaku Co., Ltd., Yao-Shi (JP)

( * ) Notice: Subject to any disclaimer, the term of this patent is extended or adjusted under 35 U.S.C. 154(b) by 0 days.

(21) Appl. No.: 13/355,647

(22) Filed: Jan. 23, 2012

(65) Prior Publication Data
US 2012/0121907 A1 May 17, 2012

Related U.S. Application Data

(62) Division of application No. 12/066,057, filed as application No. PCT/JP2006/318261 on Sep. 14, 2006, now Pat. No. 8,129,020.

(30) Foreign Application Priority Data

Sep. 16, 2005 (JP) ................... 2005-303626

(51) Int. Cl.
*B32B 1/00* (2006.01)
*B32B 5/16* (2006.01)
*C08J 9/22* (2006.01)
*C08J 9/00* (2006.01)

(52) U.S. Cl.
USPC .................. 428/402; 428/402.21; 428/402.2; 428/403; 521/50; 521/56; 521/57

(58) Field of Classification Search
USPC ............ 428/402.21, 402.2, 402, 403; 521/50, 521/57, 56, 76, 142
See application file for complete search history.

(56) References Cited

U.S. PATENT DOCUMENTS 3,615,972 A 10/1971 Morehouse et al.
4,108,928 A 8/1978 Swan, Jr.
(Continued)

FOREIGN PATENT DOCUMENTS

EP 0056219 A 7/1982
EP 0 320 473 A1 6/1989
(Continued)

OTHER PUBLICATIONS

The extended European Search Report of corresponding European Application No. 06797973.2, dated Jun. 23, 2010.
(Continued)

*Primary Examiner* — James J Seidleck
*Assistant Examiner* — S. Camilla Pourbohloul
(74) *Attorney, Agent, or Firm* — Global IP Counselors, LLP

(57) ABSTRACT

The present invention provides heat-expanded microspheres having high packing efficiency, and a production method thereof. The heat-expanded microspheres are produced by expanding heat-expandable microspheres, which comprise shell of thermoplastic resin and a blowing agent encapsulated therein having a boiling point not higher than the softening point of the thermoplastic resin and have an average particle size from 1 to 100 micrometer, at a temperature not lower than their expansion initiating temperature, and the heat-expanded microspheres result in a void fraction not higher than 0.70.

8 Claims, 4 Drawing Sheets

U.S. PATENT DOCUMENTS

| | | |
|---|---|---|
| 4,397,799 A | 8/1983 | Edgren et al. |
| 5,180,752 A | 1/1993 | Melber et al. |
| 2003/0114546 A1 | 6/2003 | Satake et al. |
| 2003/0143399 A1 | 7/2003 | Satake et al. |
| 2005/0080151 A1* | 4/2005 | Miki et al. ............ 521/50 |
| 2006/0063000 A1 | 3/2006 | Tokumura et al. |
| 2007/0154711 A1* | 7/2007 | Masuda et al. ........ 428/402.22 |

FOREIGN PATENT DOCUMENTS

| | | |
|---|---|---|
| EP | 1 262 513 A1 | 12/2002 |
| GB | 1 233 800 A | 5/1971 |
| JP | S57-137323 A | 8/1982 |
| JP | S59-053290 B | 12/1984 |
| JP | H03-273037 A | 12/1991 |
| JP | 2002-012693 A | 1/2002 |
| WO | WO-2004/058910 A1 | 7/2004 |
| WO | WO2004/074396 A | 9/2004 |
| WO | WO2005/049698 A | 6/2005 |

OTHER PUBLICATIONS

Official Communication of the corresponding European Application No. 06797973.2, dated Jan. 17, 2013.

* cited by examiner

THERMALLY EXPANDED MICROSPHERES AND A PROCESS FOR PRODUCING THE SAME

CROSS-REFERENCE TO RELATED APPLICATIONS

This application is a division application of U.S. patent application Ser. No. 12/066,057 filed on Mar. 6, 2008, which in turn is National Stage application of PCT/JP2006/318261, filed on September 2006. The entire disclosures of U.S. patent application Ser. No. 12/066,057 and PCT/JP2006/318261 are hereby incorporated herein by reference.

This application also claims priority to Japanese Patent Application No. 2005-303626 filed on Sep. 16, 2005. The entire disclosure of Japanese Patent Application No. 2005-303626 is hereby incorporated herein by reference.

TECHNICAL FIELD

The present invention relates to heat-expanded microspheres, and a production process thereof.

TECHNICAL BACKGROUND

Heat-expandable microspheres which have a structure comprising a shell of thermoplastic resin and a blowing agent encapsulated therein are generally called heat-expandable microcapsules. Thermoplastic resins usually include vinylidene chloride copolymers, acrylonitrile copolymers, and acrylic copolymers, and blowing agents mostly employed are hydrocarbons, such as isobutane and isopentane. (See U.S. Pat. No. 3,615,972)

Such heat-expandable microcapsules are processed into lightweight hollow particulates (heat-expanded microspheres) by heating and expanding. For example, a process of spraying a dispersion of heat-expandable microcapsules into hot air to simultaneously expand and dry the microcapsules has been proposed as a process for expanding heat-expandable microcapsules. (See Japanese Patent Document JP B 59-53290) The process, however, presents a problem, in that the deposition of aggregated microcapsules at the end of the spray used is highly likely.

For solving those problems described above, the inventors of the present invention have developed a process for producing hollow particulates wherein heat-expandable microcapsules are heated and expanded in dry hot gas flow, the residual amount of unexpanded raw material, i.e. the heat-expandable microcapsule, in the expanded microcapsule is lowered, and the generation of aggregated microspheres is minimized. (See PCT Patent Document WO 2005/049698).

DISCLOSURE OF INVENTION

Technical Problem

Although the property of heat-expanded microspheres produced in the process is rather satisfactory, further improvement in their property is required. For example, hollow microspheres are exceedingly bulky for their weight in most cases (in other words, they have low packing efficiency and high void fractions). Thus they cause problems, such as extremely poor storing efficiency and transferring efficiency.

When heat-expanded microspheres are mixed with other materials to be made into hollow particulate composition, the heat-expanded microspheres may be destroyed or collapsed by external force (mixing stress) in the mixing and agitating operation. For this reason, heat-expanded microspheres are required to be highly resistant to mixing stress (or to have repeated-compression durability). When heat-expandable microspheres are heated excessively, they form aggregated microspheres (excessively expanded microspheres), which have comparatively thin shell for their diameter. The thin shell of excessively expanded microspheres leads to a problem, that is, poor durability of the microspheres against repeated compression.

The object of the present invention is to provide heat-expanded microspheres having high packing efficiency and to provide a production process thereof.

Technical Solution

For solving the problems described above, the inventors of the present invention have studied diligently and drawn out a conclusion that the packing efficiency of hollow microspheres is improved by increasing the number of hollow microspheres filled in a certain volume, and that the shortest way to the improvement is to improve the method of producing hollow microspheres in dry process which had been developed by the inventors as disclosed in the Patent Reference 3. In the course of study for the improvement of the production process, the inventors have found a problem caused by the heating apparatus, that is, inconstant temperature of the hot gas flow, which sometimes fluctuates in a wide range about 50 degree. C. depending on the points of temperature measurement (i.e., temperature variation depending on the measuring points in hot gas flow). Then the inventors have newly found that minimizing the variation of hot gas temperature with some design or modification enables the production of heat-expanded microspheres having high packing efficiency (in other words, low void fractions) and high durability to repeated compression, and have achieved the present invention.

The heat-expanded microspheres of the present invention are produced in a method in which heat-expandable microspheres, each of which comprises a shell of thermoplastic resin and a blowing agent encapsulated therein having a boiling point not higher than the softening point of the thermoplastic resin and has an average particle size ranging from 1 to 100 micrometer, are heated to a temperature not lower than their expansion initiating temperature and expanded. The void fraction of the heat-expanded microspheres is 0.70 or less.

The method of producing the heat-expanded microspheres of the present invention comprises the steps of feeding a gas fluid containing a plurality of heat-expandable microspheres, each of which comprises a shell of thermoplastic resin and a blowing agent encapsulated therein having a boiling point not higher than the softening point of the thermoplastic resin, and has an average particle size ranging from 1 to 100 micrometer, through a gas-introducing tube equipped with a dispersion nozzle on its outlet and fixed inside a hot gas flow, and then jetting the gas fluid from the dispersion nozzle; making the gas fluid collide with a collision plate fixed under the dispersion nozzle in order to disperse the heat-expandable microspheres in the hot gas flow; and bringing the dispersed heat-expandable microspheres into contact with the hot gas flow, the temperature difference of which does not exceed 40 degree. C., and heating them at a temperature not lower than the expansion initiating temperature of the heat-expandable microspheres and thus expanding the same.

Another method of producing the heat-expanded microspheres of the present invention comprises the steps of feeding a gas fluid containing a plurality of heat-expandable microspheres, each heat-expandable microsphere comprising a shell of thermoplastic resin and a blowing agent encapsulated therein having a boiling point not higher than the softening point of the thermoplastic resin, and the plurality of heat-expandable microspheres having an average particle size from 1 to 100 micrometer, through a gas-introducing tube equipped with a dispersion nozzle on an outlet thereof and fixed inside a hot gas flow, and then jetting the gas fluid from the dispersion nozzle; making the gas fluid collide with a collision plate fixed on a downstream position of the dispersion nozzle in order to disperse the heat-expandable microspheres in the hot gas flow; and heating the dispersed heat-expandable microspheres in the hot gas flow, which contains turbulent flow generated by a turbulent flow generating member set at an upstream position of the hot gas flow, at a temperature not lower than the expansion initiating temperature of the heat-expandable microspheres and thus expanding the same.

Advantageous Effects

The heat-expanded microspheres of the present invention have high packing efficiency. In addition, the heat-expanded microspheres of the present invention contain extremely low amount of aggregated microspheres or microspheres of high true specific gravity, and have excellent flowability and minimum variation in their mass specific gravity.

In a method of producing the heat-expanded microspheres of the present invention, dispersed heat-expandable microspheres are contacted to the hot gas flow the temperature of which varies in a range within 40 degree. C. and/or which contains turbulent flow generated with a turbulent flow generating member set at an upstream position of the hot gas flow, and thus the heat-expandable microspheres are heated and expanded at almost constant temperature. Consequently the resultant heat-expanded microspheres have high packing efficiency. In addition, the resultant heat-expanded microspheres contain extremely low amount of aggregated microspheres generated from excessive heating (excessively expanded microspheres) or microspheres of high true specific gravity generated from insufficient heating, have minimum variation in their mass specific gravity, and are excellent in their flowability and repeated-compression durability.

EXPLANATION OF REFERENCES

Figure 1:
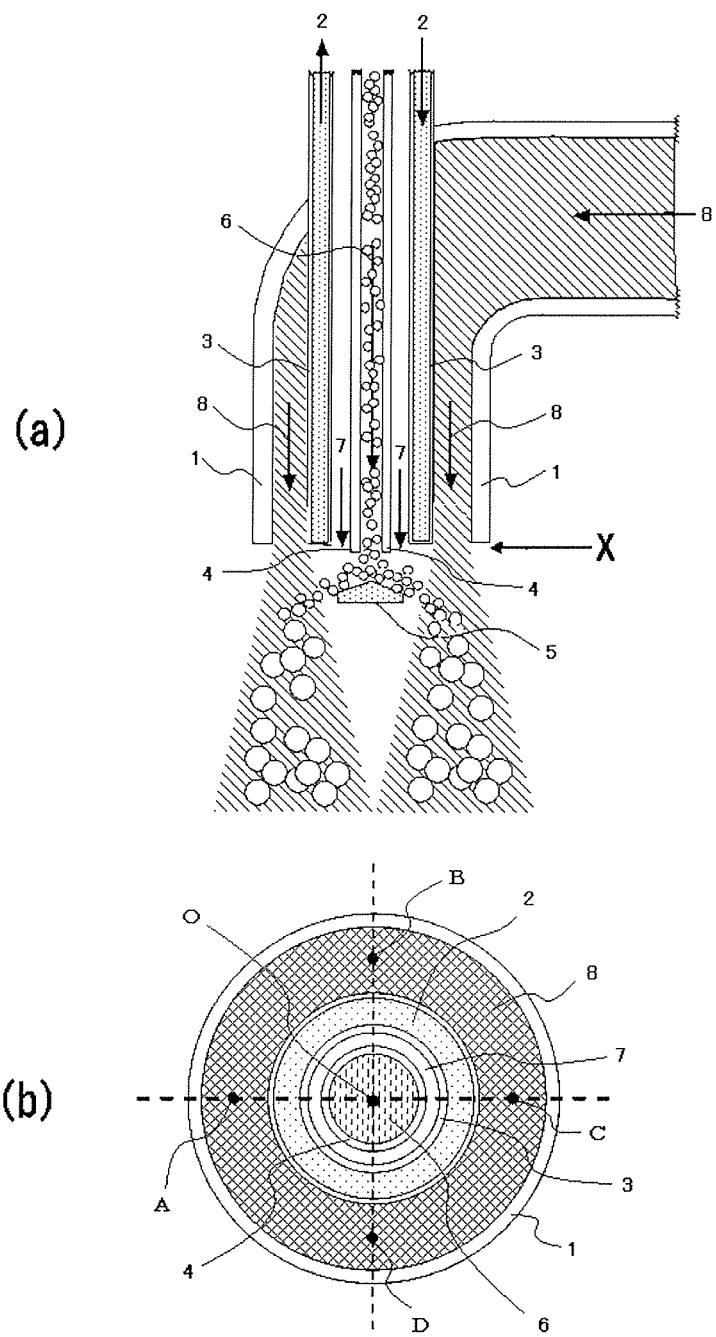
FIG. 1: (a) a diagram of the expanding device of the manufacturing equipment, and (b) a plan view illustrating temperature levels at a certain plane in hot gas flow.

1: Hot gas nozzle
2: Cooling medium flow
3: Overheating preventive tube
4: Dispersion nozzle
5: Collision plate
6: Gas fluid containing heat-expandable microspheres
7: Inert gas flow
8: Hot gas flow
9: Mesh
10: Ring
11: Expansion chamber

BEST MODE FOR CARRYING OUT THE INVENTION

The present invention is described in detail below.

[Heat-Expandable Microspheres]

The heat-expandable microspheres used in the production process of the present invention have an average particle size ranging from 1 to 100 micrometer, and comprise a shell of thermoplastic resin and a blowing agent which has a boiling point not higher than the softening point of the thermoplastic resin and is encapsulated in the shell; and each of the heat-expandable microspheres exhibits heat-expandability as a whole (or expands under heating as a whole).

The blowing agent is not specifically restricted so far as it is a substance having a boiling point not higher than the softening point of the thermoplastic resin. The examples of such blowing agents are $C_{1-12}$ hydrocarbons and their halogen compounds, fluorine compounds, tetraalkyl silane, and compounds which thermally decompose to generate gas, such as azodicarbonamide. One of those blowing agents or a mixture of at least two of them may be employed.

The examples of the $C_{1-12}$ hydrocarbons are propane, cyclopropane, propylene, butane, normal butane, isobutane, cyclobutane, normal pentane, cyclopentane, isopentane, neopentane, normal hexane, isohexane, cyclohexane, heptane, cycloheptane, octane, isooctane, cyclooctane, 2-methyl pentane, 2,2-dimethyl butane, and petroleum ether. Any of these hydrocarbons having a linear, branched or ali-cyclic structure are employable, and aliphatic hydrocarbons are preferable.

The examples of the halogen compounds of $C_{1-12}$ hydrocarbons are methyl chloride, methylene chloride, chloroform, and carbon tetrachloride. Above all halogen compounds (fluorine compounds, chlorine compounds, bromine compounds, iodine compounds, etc.) of the above-mentioned hydrocarbons are preferable.

The fluorine compounds are not specifically restricted so far as they contain fluorine atoms in their molecules, and $C_{2-10}$ compounds having an ether structure and containing no chlorine and bromine compounds are preferable. Examples of such fluorine compounds are hydrofluoroethers, such as $C_3H_2F_7OCF_2H$, $C_3HF_6OCH_3$, $C_2HF_4OC_2H_2F_3$, $C_2H_2F_3OC_2H_2F_3$, $C_4HF_8OCH_3$, $C_3H_2F_5OC_2H_3F_2$, $C_3HF_6OC_2H_2F_3$, $C_3H_3F_4OCHF_2$, $C_3HF_6OC_3H_2F_5$, $C_4H_3F_6OCHF_2$, $C_3H_3F_4OC_2HF_4$, $C_3HF_6OC_3H_3F_4$, $C_3F_7OCH_3$, $C_4F_9OCH_3$, $C_4F_9OC_2H_5$, and $C_7F_{15}OC_2H_5$. Those hydrofluoroethers may have either linear or branched (fluoro) alkyl groups.

Any of blowing agents having a boiling point not higher than the softening point of the thermoplastic resin may be employed. The blowing agent may wholly comprise fluorine compounds, and may comprise the mixture of fluorine compounds and compounds other than fluorine compounds having a boiling point not higher than the softening point of the thermoplastic resin. Such compounds are not specifically restricted, and those selected from the examples of blowing agents described above can be used. Compounds other than fluorine compounds may appropriately be selected according to the range of the expanding temperature of heat-expandable microspheres.

In a blowing agent containing a fluorine compound, the weight ratio of the fluorine compound is preferably greater than 50 weight percent of the whole of the blowing agent, more preferably greater than 80 weight percent, and most preferably greater than 95 weight percent. Greater weight ratio of a fluorine compound in a blowing agent gives more influence of the properties of the fluorine compound to heat-expandable microspheres so as to impart flame retarding and flameproof properties to the heat-expandable microspheres.

The heat-expandable microspheres comprise a thermoplastic resin, for example, a resin produced by polymerizing a monomer mixture consisting essentially of a radically polymerizable monomer. The monomer mixture is blended with a proper amount of a polymerization initiator to be polymerized and formed into the shell of the heat-expandable microspheres.

The radically polymerizable monomers, which are not specifically restricted, include nitrile monomers, such as acrylonitrile, methacrylonitrile, alpha-chloracrylonitrile, alpha-ethoxyacrylonitrile, and fumaronitrile; monomers having carboxyl groups, such as acrylic acid, methacrylic acid, itaconic acid, maleic acid, fumaric acid, and citraconic acid; vinylidene chloride; vinyl acetate; (meth)acrylate monomers, such as methyl (meth)acrylate, ethyl (meth)acrylate, n-butyl (meth)acrylate, isobutyl (meth)acrylate, t-butyl (meth)acrylate, isobornyl (meth)acrylate, cyclohexyl (meth)acrylate, benzyl (meth)acrylate, and beta-carboxyethyl acrylate; styrene monomers, such as styrene, alpha-methyl styrene, and chlorostyrene; acryl amide monomers, such as acryl amide, substituted acryl amide, methacrylic amide, and substituted methacrylic amide; and maleimide monomers, such as N-phenyl maleimide, N-(2-chlorophenyl) maleimide, N-cyclohexyl maleimide, and N-lauryl maleimide. All or part of the carboxyl groups in the monomers having carboxyl groups may be neutralized in polymerization.

One of or a mixture of at least two of those radically polymerizable monomers may be used. Above all a monomer mixture containing at least one radical polymerizable monomer selected from the group consisting of nitrile monomers, (meth)acrylate monomers, monomers having carboxyl groups, styrene monomers, vynil acetate, and vinylidene chloride is preferable. In particular, a monomer mixture consisting essentially of a nitrile monomer is preferable. The preferable weight ratio of the nitrile monomer in the monomer mixture is at least 20 weight percent, more preferably at least 50 weight percent, and most preferably at least 70 weight percent. For achieving satisfactory heat resistance of the shell of microspheres, the preferable weight ratio of the nitrile monomer is at least 80 weight percent, more preferably at least 90 weight percent, and most preferably at least 95 weight percent.

A monomer mixture containing a nitrile monomer and a monomer having a carboxyl group is more preferable, because such monomer mixture imparts heat resistance to heat-expandable microspheres, imparts re-expanding capacity to heat-expanded microspheres produced by expanding the heat-expandable microspheres, and simultaneously enables the heat-expanded microspheres to start re-expansion at 90 degree. C. or higher temperature (preferably at 100 degree. C. or higher and more preferably at 120 degree. C. or higher). The weight ratio of the nitrile monomer in the monomer mixture should preferably range from 20 to 80 weight percent, more preferably from 20 to 60 weight percent, further preferably from 20 to 50 weight percent, and most preferably from 20 to 40 weight percent, for controlling the retention and blowing performance of a blowing agent encapsulated in microspheres and the re-expansion initiating temperature of heat-expanded microspheres. The weight ratio of the monomer having carboxyl groups in the monomer mixture should preferably range from 20 to 80 weight percent, more preferably from 40 to 80 weight percent, further preferably from 50 to 80 weight percent, and most preferably from 60 to 80 weight percent, for controlling the re-expansion initiating temperature of heat-expanded microspheres and the retention and blowing performance of a blowing agent encapsulated in microspheres.

In addition to the radically polymerizable monomers mentioned above, the monomer mixture may contain a polymerizable monomer (a cross-linking agent) having at least two polymerizable double bonds. The polymerization with a cross-linking agent leads to decreased ratio of aggregated microspheres in heat-expanded microspheres produced by the production process of the present invention, and minimized loss in the retention of encapsulated blowing agent in heat-expanded microspheres, which is effective to thermally expand microspheres.

In the present invention, the retention (percent) of an encapsulated blowing agent in heat-expanded microspheres is defined as $G_2/G_1 \times 100$, where $G_1$ is the ratio of a blowing agent encapsulated in heat-expandable microspheres before expansion, and $G_2$ is the ratio of the blowing agent encapsulated in heat-expanded microspheres produced by heating and expanding the heat-expandable microspheres.

The cross-linking agent is not specifically restricted, and includes aromatic divinyl compounds, such as divinyl benzene and divinyl naphthalene; and di(meth)acrylates, such as allyl methacrylate, triacrylformal, triallyl isocyanate, ethylene glycol di(meth)acrylate, diethylene glycol di(meth)acrylate, triethylene glycol di(meth)acrylate, 1,4-butanediol di(meth)acrylate, 1,9-nonanediol di(meth)acrylate, 1,10-decanediol di(meth)acrylate, PEG (200) di(meth)acrylate, PEG (400) di(meth)acrylate, PEG (600) di(meth)acrylate, neopentylglycol di(meth)acrylate, 1,4-butanediol dimethacrylate, 1,6-hexanediol di(meth)acrylate, 1,9-nonanediol di(meth)acrylate, trimethylolpropane trimethacrylate, glycerin dimethacrylate, dimethylol tricyclodecane diacrylate, pentaerythritol tri(meth)acrylate, pentaerythritol tetraacrylate, dipentaerythritol hexaacrylate, neopentylglycol acrylic acid benzoate, trimethylolpropane acrylic acid benzoate, 2-hydroxy-3-acryloyloxypropyl methacrylate, hydroxypivalic acid neopentylglycol diacrylate, ditrimethylolpropane tetraacrylate, and 2-butyl-2-ethyl-1,3-propanediol diacrylate. One of or a mixture of at least two of those cross-linking agents are applicable.

In the above description, the series of the compounds written as "PEG (#***) dimethacrylate" are polyethylene glycol di (meth)acrylate, wherein the average molecular weight of their polyethylene glycol moieties is represented by the number in the parentheses.

The weight ratio of the cross-linking agents is not particularly restricted, and the preferable weight ratio ranges from 0.01 to 5 weight percent of the monomer mixture, more preferably from 0.05 to 3 weight percent, considering the degree of cross-linking, the retention of a blowing agent encapsulated in the shell of microspheres, and the heat resistance and heat-expanding performance of the microspheres.

The polymerization initiator is not specifically restricted, and known polymerization initiators may be used. The examples of those polymerization initiators are peroxides, such as t-butyl peroxyisobutylate, t-butyl peroxy-2-ethylhexanoate, t-hexyl peroxy-2-ethylhexanoate, 2,5-dimethyl-2,5-bis(2-ethylhexanoyl peroxy)hexane, 1,1,3,3-tetramethylbutyl peroxy-2-ethylhexanoate, t-butyl peroxypivalate, t-hexyl peroxypivalate, t-butyl peroxyneodecanoate, t-hexyl peroxyneodecanoate, 1-cyclohexyl-1-methylethyl peroxyneodecanoate, 1,1,3,3-tetramethylbutyl peroxyneodecanoate, cumyl peroxyneodecanoate, t-butyl peroxy-3,5,5-trimethylhexanoate, octanoyl peroxide, lauroyl peroxide, stearyl peroxide, succinic acid peroxide, and benzoil peroxide; and azo compounds, such as 2,2'-azobis (4-methoxy-2,4-dimethyl valeronitrile), 2,2'-azobis isobutyronitrile, 2,2'-azobis (2,4-dimethyl valeronitrile), 2,2'-azobis (2-methyl propionate), and 2,2'-azobis (2-methyl butyronitrile). Preferable polymerization initiators are oil-soluble polymerization initiators which are soluble in radically polymerizable monomers.

The weight ratio of the polymerization initiators is not particularly restricted, and the preferable weight ratio ranges from 0.2 to 7.0 weight percent of the monomer mixture, more preferably from 0.3 to 5.0 weight percent, and most preferably from 0.4 to 3.0 weight percent, considering the expanding performance of microspheres and the retention of a blowing agent encapsulated in the microspheres.

The heat-expandable microspheres are produced with the techniques employed in known methods of producing heat-expandable microcapsules. In an example of the methods of producing heat-expandable microspheres, a monomer mixture consisting essentially of a radical polymerizable monomer and optionally containing a cross-linking agent is mixed with a blowing agent and a polymerization initiator, and the resultant mixture is suspension-polymerized in an aqueous suspension containing a proper suspension stabilizer.

The examples of the dispersion stabilizers in the aqueous suspension are colloidal silica, colloidal calcium carbonate, magnesium hydroxide, calcium phosphate, aluminum hydroxide, ferric hydroxide, calcium sulfate, sodium sulfate, calcium oxalate, calcium carbonate, barium carbonate, magnesium carbonate, and alumina sol. The preferable ratio of the dispersion stabilizer in the monomer mixture ranges 0.1 to 20 weight percent. In addition, dispersion-stabilizing auxiliaries exemplified by polymer-type dispersion-stabilizing auxiliaries including diethanol amine-aliphatic dicarboxylic acid condensates, gelatine, polyvinyl pyrolidone, methyl cellulose, polyethylene oxide, and polyvinyl alcohol; and emulsifiers including cationic surfactants such as alkyltrimethyl ammonium chloride and dialkyldimethyl ammonium chloride, anionic surfactants such as sodium alkyl sulfate, and amphoteric surfactants such as alkyldimethyl betaine aminoacetate and alkyldihydroxyethyl betaine aminoacetate may be employed. The preferable ratio of the dispersion-stabilizing auxiliaries ranges from 0.05 to 2 weight percent of the monomer mixture.

An aqueous suspension containing a dispersion stabilizer is prepared by mixing a dispersion stabilizer and dispersion stabilizing auxiliary in water (for example, deionized water). The pH of the aqueous suspension in polymerization is properly determined according to the variants of a dispersion stabilizer and dispersion stabilizing auxiliary. A water-soluble reducing agent may be added to the aqueous suspension, and it restrains the generation of aggregated microspheres during polymerization. The examples of the water-soluble reducing agents are nitrites of alkali metals, such as sodium nitrite and potassium nitrite, stannous chloride, stannic chloride, ferrous chloride, ferric chloride, ferrous sulfate, and water-soluble ascorbic acids. Above all nitrites of alkali metals are preferable for their stability in water. The preferable ratio of the reducing agents ranges from 0.0001 to 1 weight percent of the monomer mixture, more preferably from 0.0003 to 0.1 weight percent.

The polymerization temperature is controlled according to the variants of polymerization initiators, and it should preferably range from 40 to 100 degree. C., more preferably from 45 to 90 degree. C., and most preferably from 50 to 85 degree. C. The initial pressure for the polymerization should preferably range from 0 to 5.0 MPa in gage pressure, more preferably from 0.1 to 3.0 MPa, and most preferably from 0.2 to 2.0 MPa.

The ratio of the blowing agent in the resultant heat-expandable microspheres should preferably be controlled within the range from 2 to 85 weight percent of the microspheres, more preferably from 5 to 60 weight percent, and most preferably from 7 to 50 weight percent, from the view point of attaining excellent blowing performance of the heat-expandable microspheres and controlling the thickness of the thermoplastic resin shell of the heat-expandable microspheres in order to maintain a proper retention of encapsulated blowing agent. The preferable ratio of a blowing agent containing fluorine compounds ranges from 10 to 60 weight percent, more preferably from 15 to 50 weight percent.

The average particle size of the heat-expandable microspheres may be freely designed according to their application, and therefore is not specifically limited. A normal average particle size ranges from 1 to 100 micrometer, preferably from 2 to 80 micrometer, and more preferably from 5 to 60 micrometer.

The coefficient of variation, CV, of the particle size distribution of the heat-expandable microspheres is not particularly restricted, and it is preferably 30 percent or less, more preferably 27 percent or less, and most preferably 25 percent or less. The coefficient of variation, CV, is calculated by the following expressions (1) and (2):

[Expression 1]

$$CV = (s/<x>) \times 100 \text{ (percent)} \quad (1)$$

$$s = \left\{ \sum_{i=1}^{n} (xi - <x>)^2 / (n-1) \right\}^{1/2} \quad (2)$$

where s is a standard deviation of particle size, $<x>$ is an average particle size, xi is a particle size of an i-th particulate, and n is the number of particulates.

Some components other than the shell material or blowing agent may be added to or used to modify heat-expandable microspheres. For example, adhering a particulate filler on the outer surface of the shell of heat-expandable microspheres is preferable for improving their dispersibility and flowability in use.

The particulate filler may be either of an organic and inorganic fillers, and the variants and amount of particulate fillers are selected according to the use of microspheres.

The examples of organic fillers are metal soaps, such as magnesium stearate, calcium stearate, zinc stearate, barium stearate, and lithium stearate; synthetic waxes, such as polyethylene wax, lauric acid amide, myristic acid amide, palmitic acid amide, stearic acid amide, and hydrogenated castor oil; and resin powders, such as polyacrylamide, polyimide, nylon, methyl polymethacrylate, polyethylene, and polytetrafluoroethylene.

The examples of inorganic fillers are those having a layered structure, such as talc, mica, bentonite, sericite, carbon black, molybdenum disulfide, tungsten disulfide, carbon fluoride, calcium fluoride, and boron nitride; and others, such as silica, alumina, isinglass, calcium carbonate, calcium hydroxide, calcium phosphate, magnesium hydroxide, magnesium phosphate, barium sulfate, titanium dioxide, zinc oxide, ceramic beads, glass beads, and crystal beads.

One of or a mixture of at least two of the particulate fillers may be employed.

The average particle size of the particulate fillers is preferably not greater than one tenth of the average particle size of heat-expandable microspheres before adhering the particulate filler. The average particle size means the average particle size of primary particles.

The amount of a particulate filler adhered onto the heat-expandable microspheres is not specifically limited, and should preferably range from 0.1 to 95 weight percent of heat-expandable microspheres before adhering the filler, more preferably from 0.5 to 60 weight percent, further preferably from 5 to 50 weight percent, and most preferably from 8 to 30 weight percent, for properly controlling the true specific gravity of heat-expandable microspheres and optimizing the function of a particulate filler.

A particulate filler is adhered onto the outer surface of heat-expandable microspheres by mixing heat-expandable microspheres and a particulate filler. The mixing process is not specifically restricted, and a device of a very simple mechanism, such as a vessel and paddle blades, is employable. Ordinary powder mixers for shaking or agitating powders are also applicable. The powder mixers include those which can shake and agitate, or agitate powders, such as ribbon-type mixers and vertical screw mixers. Recently, highly efficient multi-functional powder mixers manufactured by combining several agitation devices, such as Super Mixer (manufactured by Kawata MFG Co., Ltd.), High-Speed Mixer (manufactured by Fukae Co., Ltd.) and New-Gram Machine (manufactured by Seishin Enterprise Co., Ltd.), have become available.

The moisture content of the heat-expandable microspheres should preferably be 5 weight percent or less, more preferably 3 weight percent or less, for uniform heating and expanding.

The heat-expandable microspheres are applicable as a lightweight filler for automobile paints, expanding particles in expandable inks for wallpaper and apparel design, an expanding material for lightening resin compositions, a sensitizer for explosives, a light diffuser, and a void-forming agent.

[Production Process for Heat-Expanded Microspheres]

The production method of the heat-expanded microspheres of the present invention comprises the steps of feeding a gas fluid containing heat-expandable microspheres, the starting material described above, through a gas-introducing tube equipped with a dispersion nozzle on its outlet and fixed inside a hot gas flow, and then jetting the gas flow from the dispersion nozzle (jetting step); making the gas fluid collide on a collision plate fixed under the dispersion nozzle to disperse heat-expandable microspheres into the hot gas flow (dispersing step); and heating the dispersed heat-expandable microspheres in the hot gas flow at a temperature not lower than their expansion initiating temperature, where the difference in the heating temperature is not greater than 40 degree. C., so as to expand the heat-expandable microspheres (expanding step).

Another production method of the heat-expanded microspheres of the present invention comprises the steps of feeding a gas fluid containing heat-expandable microspheres, the starting material described above, through a gas-introducing tube equipped with a dispersion nozzle on its outlet and fixed inside a hot gas flow, and then jetting the gas flow from the dispersion nozzle (jetting step); making the gas fluid collide on a collision plate fixed under the dispersion nozzle to disperse heat-expandable microspheres into the hot gas flow (dispersing step); and heating the dispersed heat-expandable microspheres in the hot gas flow, which contains turbulent flow generated by a turbulent flow generating member set at an upstream position of the hot gas flow, at a temperature not lower than their expansion initiating temperature so as to expand the heat-expandable microspheres (expanding step).

In the two production methods mentioned above, the same jetting and dispersing steps are employed. One of the expanding steps may further include the conditions of another expanding step.

The expanding device of the manufacturing equipment used in the production method of the present invention is explained referring to FIG. 1 (a), which shows the structure common to all of such equipment. The expanding device in FIG. 1 (a) is mere an example of such device, and the expanding device is not restricted within its category. The expanding device comprises a gas introducing tube (without a reference numeral) equipped with a dispersion nozzle 4 on its outlet and fixed at the center of the equipment, a collision plate 5 set under the dispersion nozzle 4, an overheating preventive tube 3 fixed around the gas introducing tube with some distance, and a hot gas nozzle 1 fixed around the overheating preventive tube with some distance. At the expanding device, a gas fluid 6 containing heat-expandable microspheres is flowed through the gas introducing tube in the direction marked with the arrow, and an inert gas 7 is flowed through the space between the gas introducing tube and the overheating preventive tube 3 in the direction marked with the arrow in order to improve the dispersion of heat-expandable microspheres and to prevent the overheating of the gas introducing tube and collision plate. In addition, hot gas flow 8 is supplied in the direction marked with the arrow in the space between the overheating preventive tube 3 and the hot gas nozzle 1. In the overheating preventive tube 3, a cooling medium flow 2 is flowed for cooling in the direction marked with the arrow. Overheating-preventive function should preferably be imparted to the gas introducing tube and/or the collision plate 5 for minimizing aggregated or fused microspheres.

The collision plate 5 may be fixed on a part, such as the gas-introducing tube mentioned above, and may be fixed on a part other than the parts mentioned above. The shape of the collision plate 5 is not specifically restricted, and the examples of the form include fusiform, conical, pyramid, spherical, hemispherical, or a combination thereof.

At the jetting step, the gas fluid 6 containing heat-expandable microspheres is flowed through the gas introducing tube equipped with the dispersion nozzle 4 on its outlet and fixed at the inside of the hot gas flow 8, and the gas fluid 6 is jetted from the dispersion nozzle 4. The gas fluid 6 is not specifically restricted and may be any of gases containing heat-expandable microspheres. An inert gas such as air, nitrogen, argon, and helium containing heat-expandable microspheres is preferable. The moisture content of the gas fluid 6 is preferably not greater than 30 g/m$^3$, and more preferably not greater than 9.3 g/m$^3$, for dispersing heat-expandable microspheres. The flow rate of the gas fluid 6 is not specifically restricted, but it should be controlled at a rate which enables each of heat-expandable microspheres to be subjected to the same thermal history so far as possible and be expanded in the hot gas flow 8 at the subsequent dispersing step.

Then at the dispersing step, the gas fluid 6 collides to the collision plate 5 fixed under the dispersion nozzle 4 so as to disperse the heat-expandable microspheres uniformly in the hot gas flow 8. The gas fluid 6 emitted from the dispersion nozzle 4 is introduced to the collision plate 5 with the inert gas flow 7, and collide to the plate.

Finally at the expanding step, the dispersed heat-expandable microspheres are heated and expanded in the hot gas flow 8 at a temperature not lower than the expansion initiating temperature of the microspheres. The hot gas flow for the heating has a temperature difference within 40 degree. C.

and/or contains turbulent flow generated with a turbulent flow generating member fixed at an upstream position of the hot gas flow. This enables almost all of heat-expandable microspheres to be subjected to almost the same thermal history continuously, and the resultant heat-expanded microspheres have high packing efficiency.

Various ideas were contributed for producing heat-expanded microspheres having high packing efficiency. Supplying hot gas, which has already been heated to a certain temperature, to heat-expandable microspheres is an example of such ideas. Only with the idea, however, hot gas flow of constant temperature may not be supplied uniformly (with constant flow rate or pressure) and continuously to be contacted to heat-expandable microspheres, because various factors, such as the diameter and curvature of hot gas flow supplying pipe of the manufacturing equipment, flow rate of hot gas flow, and the diameter of each nozzle, relate complicatedly to the hot gas supply. For example, the hot gas flow supplying pipe is usually short and has curved structure for minimizing thermal loss. At the outer side of the curved part, the temperature of hot gas is measured higher while the temperature of the hot gas at the inner side of the curved part is measured lower. In such cases, resultant heat-expanded microspheres have low void fraction that is more frequent than expected. However, the above-mentioned simple technique, which subjects all of heat-expandable microspheres to hot gas having minimum range of temperature distribution, enables production of heat-expanded microspheres having excellent packing efficiency.

The phrase "temperature difference within 40 degree. C. in gas flow" means that the difference between the maximum and minimum temperatures (hereinafter sometimes referred to only as "temperature difference") detected at several points in the hot gas flow 8 just before or at the contact with dispersed heat-expandable microspheres is not greater than 40 degree. C. In other words, the hot gas flow just before or at the contact with dispersed heat-expandable microspheres has a temperature distribution only within 40 degree. C. The temperature difference (or temperature distribution) should preferably be within 30 degree. C., more preferably within 20 degree. C., further preferably within 10 degree. C., and most preferably within 5 degree. C.

Here all of the above-mentioned points of temperature determination should locate almost on a plane vertical to the direction of the hot gas flow 8, and those points should preferably locate at an upstream position of the point where dispersed heat-expandable microspheres contact with the hot gas flow 8 for the first time, and at a downstream position of the turbulent flow generating member described below. More preferably the points for temperature determination should locate near the end of the hot gas nozzle, for example, the plane just above the arrow marked "X" in FIG. 1 (a). The number of the temperature determination points is not specifically restricted, and should preferably be at least 4, more preferably at least 6, and most preferably at least 8. Each of the temperature determination points should preferably locate almost on a plane vertical to the direction of the hot gas flow 8 and almost on a circumference having its center at a certain point (preferably at the crossing point of the center line of the gas introducing tube and a plane vertical to the direction of the hot gas flow 8) in almost equal intervals with adjacent points. Specifically such points are represented by the four points A, B, C, and D shown in FIG. 1 (b) (located on the circumference in the order), which almost locate on a circumference having its center on the point O, and preferably locate in almost equal intervals (intervals between A and B, B and C, C and D, and D and A) with adjacent points.

At the expansion step, the hot gas flow 8 may contain turbulent flow when it contacts to heat-expandable microspheres. In other words, turbulent flow may be generated in the hot gas flow with a turbulent flow generating member fixed at an upstream position of the hot gas flow. Such turbulent flow disturbs the stream of the hot gas flow 8, the temperature of which varies depending on the regions of gas flowing, and decrease the temperature difference of the hot gas flow at the contact to dispersed heat-expandable microspheres. The examples of the turbulent flow generating member include mesh 9 (refer to FIG. 2), a tray, and a ring 10 (refer to FIG. 3.) The turbulent flow generating member should be fixed to minimize the loss of gas flow pressure. For example, a turbulent flow generating member to be fixed to the hot gas flow supplying pipe in FIG. 1 (a), which is curved and then straightened, should be positioned at the straightened zone as near as possible to the curved zone (for example, near to the point marked 3).

Figure 4:
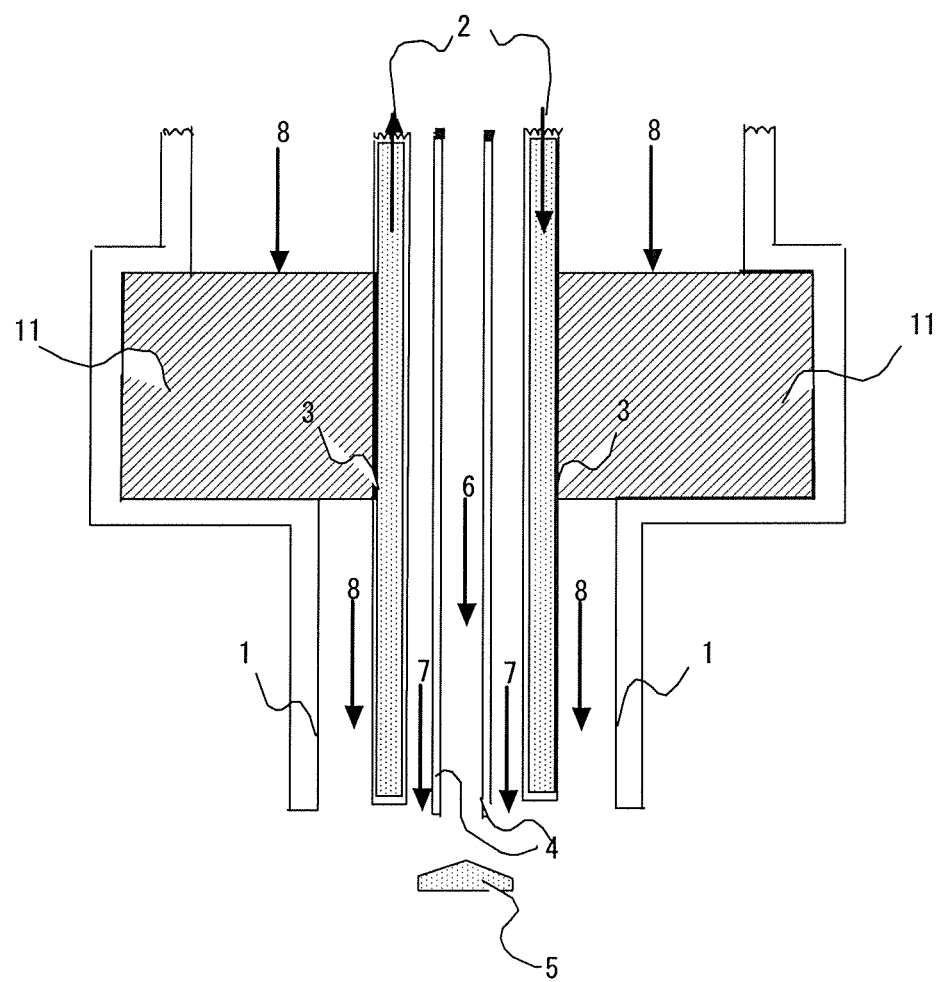
FIG. 4: A diagram of yet another example of the expanding device of the manufacturing equipment employed in a production process of the present invention.

The techniques for minimizing the temperature difference and for generating turbulent flow are not restricted within those mentioned above, and other techniques may be employed. Examples of other techniques include 1) mixing hot gas flow from plurality of hot gas sources, not only one source, thereby to minimize the temperature difference due to the difference in gas flowing distance, 2) mixing the hot gas flow from plurality of hot gas sources described in 1) to swirl the hot gas flow at the initial stage so as to minimize the temperature difference, and 3) making a space having a wider cross section than that of the gas flow pass (for example, an expansion chamber 11 or the like, refer to FIG. 4) at an upstream position of the hot gas nozzle or an upstream position in the hot gas flow 8 as a turbulent flow generating member to minimize the temperature difference. In this case, the cross sectional area of the hot gas flow pass coming into the expansion chamber should preferably be wider than the cross sectional area of the hot gas flow pass going out of the expansion chamber as shown in FIG. 4.

In such manners, heat-expandable microspheres are thermally expanded and then cooled down below the softening point of the thermoplastic resin shell with some means, such as passing them through a cooling zone, and resultant heat-expanded microspheres are collected. For collecting the microspheres, ordinary solid-gas separators, such as cyclone separators or bag filters, may be employed.

In the production method of the present invention, both of heat-expanded microspheres having re-expanding temperature and not having re-expanding temperature can be produced by controlling expanding conditions. The control of expanding conditions is not specifically restricted.

In the production method of the present invention, any of raw material, i.e., heat-expandable microspheres, can be subjected to almost the same thermal history owing to the high energy efficiency and easy temperature control, and the dispersibility of the heat-expandable microspheres in gas flow is improved. The heat-expanded microspheres obtained in the method have high packing efficiency and high durability against repeated compression. In addition, the difference in the coefficient of variation in the particle size distribution of microspheres is minimized between before and after expansion, and the resultant heat-expanded microspheres have uniform quality (particle size distribution and true specific gravity distribution, in particular). In other words, the heat-expanded microspheres obtained in the method contain minimum amount of aggregated microspheres (excessively expanded microspheres) caused by excessive heating or microspheres having high true specific gravity (raw material microspheres or slightly expanded microspheres) caused by insufficient heating, and thus the variation of the bulk specific gravity of the heat-expanded microcapsules is minimized.

In this process, the expanding conditions are easily controlled as described above, and thus almost completely heat-expanded microspheres, and heat-expanded microspheres which have a desirable re-expanding property can be produced.

[Heat-Expanded Microspheres]

The heat-expanded microspheres of the present invention are produced in the production method where heat-expandable microspheres which comprise a shell of thermoplastic resin and a blowing agent having a boiling point not higher than the softening point of the thermoplastic resin and being encapsulated in the shell, and have an average particle size ranging from 1 to 100 micrometer are heated at a temperature not lower than their expansion initiating temperature. The raw material, heat-expandable microspheres, are not specifically restricted, and the heat-expandable microspheres described above are preferable. The production method for heating and expanding heat-expandable microspheres at a temperature not lower than their expansion initiating temperature is not specifically restricted, and the process described above is preferable.

The heat-expanded microcapsules of the present invention should have a void fraction not higher than 0.70, preferably not higher than 0.65, more preferably not higher than 0.55, further preferably not higher than 0.45, further more preferably not higher than 0.40, and most preferably not higher than 0.35.

The void fraction is a physical property value for evaluating packing efficiency, and represents the ratio of void in the bulk volume of heat-expanded microspheres. Therefore heat-expanded microspheres of smaller void fraction have higher packing efficiency, higher storage and transportation efficiency, and good handling property.

The heat-expanded microspheres of the present invention should have a repeated-compression durability not lower than 75 percent, preferably not lower than 78 percent, more preferably not lower than 80 percent, further more preferably not lower than 83 percent, and most preferably not lower than 88 percent.

The repeated-compression durability is a physical property value for evaluating the durability of heat-expanded microspheres against mixing stress when they are mixed with other materials. The method of evaluating the value is described in detail in Examples. Higher values of repeated-compression durability represent better durability of microspheres against mixing stress.

Other materials are not specifically restricted, and the examples thereof are rubbers, such as natural rubber, butyl rubber, and silicone rubber; thermosetting resins, such as epoxy resins and phenol resins; sealing materials, such as urethane and silicone polymers; paints of vinyl chloride or acrylate compounds; inorganic materials, such as cement, mortar, and cordierite. These materials are mixed with heat-expanded microspheres to be made into hollow microsphere composition.

The average particle size of heat-expanded microspheres may be freely designed according to their end uses, and is not specifically restricted. For attaining sufficient retention of encapsulated blowing agent and durability of heat-expanded microspheres, the average particle size should preferably range from 1 to 1000 micrometer, more preferably from 5 to 800 micrometer, and most preferably from 10 to 500 micrometer.

The coefficient of variation (CV) of the particle size distribution of heat-expanded microspheres is not specifically restricted, and it should preferably be not greater than 30 percent, more preferably not greater than 27 percent, and most preferably not greater than 25 percent. Heat-expanded microcapsules having a CV of 30 percent or more may have poor durability against repeated compression.

For retaining the uniformity of particle size of heat-expanded microspheres, the difference between the CV of the particle size distribution of microspheres before and after expansion should be within the range of plus/minus 10 percent, preferably plus/minus 5 percent, more preferably plus/minus 3 percent, and most preferably plus/minus 1 percent. The definition of the coefficient of variation, CV, is explained with the expressions (1) and (2) in the above description about [Heat-Expandable Microspheres]. The difference in the coefficient of variation, CV, is defined as (CV of the particle size distribution of heat-expanded microspheres obtained)–(CV of the particle size distribution of raw material, heat-expandable microspheres).

The ratio of aggregated microspheres contained in heat-expanded microspheres should be not greater than 5 weight percent for retaining the uniformity of their true specific gravity, preferably not greater than 1 weight percent, more preferably not greater than 0.5 weight percent, and most preferably not greater than 0.3 weight percent. Aggregated microspheres are detected by visual inspection through electron microscope, and their amount is determined by measuring the amount of microspheres remaining on sieve after screening heat-expanded micro spheres.

The ratio of microspheres having a true specific gravity of 0.79 g/cc or higher contained in heat-expanded microspheres at 25 degree. C. (hereinafter sometimes referred to as an abbreviation, "sedimentable component ratio") should be not greater than 5 weight percent for retaining the uniformity of the true specific gravity of heat-expanded microcapsules, preferably not greater than 3 weight percent, more preferably not greater than 2 weight percent, and most preferably not greater than 1 weight percent. The ratio of microspheres having a true specific gravity of 0.79 g/cc or higher is determined by measuring the amount of sedimented component after the gravity separation of the microspheres with isopropyl alcohol (having a specific gravity of 0.79 at 25 degree. C.).

The expanding conditions in the above-mentioned production method may be controlled to produce heat-expanded microcapsules having a re-expanding temperature. The re-expanding temperature should be 90 degree. C. or higher, preferably 100 degree. C. or higher, more preferably 110 degree. C. or higher, and most preferably 120 degree. C. or higher.

The re-expanding ratio of the heat-expanded microcapsules having a re-expanding temperature should be greater than 100 percent at their maximum expanding temperature, preferably not lower than 105 percent, more preferably not lower than 120 percent, further preferably not lower than 130 percent, and most preferably not lower than 150 percent.

The end uses of heat-expanded microspheres are not specifically restricted, and include a lightweight filler for automobile paints, expanding particulates in expandable inks for wallpaper and apparel design, an expanding material for lightening resin compositions, a sensitizer for explosives, a light diffuser, and a void-forming agent.

The present invention is described specifically with the following examples and comparative examples, though the present invention is not restricted within the scope of those examples.

(Determination Methods and Definition)

[Determination of Average Particle Size and Particle Size Distribution]

A laser diffraction particle size analyzer (HEROS & RODOS, produced by SYMPATEC) was employed for the determination. Microspheres were analyzed in dry system with a dry dispersion unit, where the dispersion pressure was controlled at 5.0 bar and the degree of vacuum was controlled at 5.0 mbar. The D50 value was determined as an average particle size.

[Determination of True Specific Gravity]

The true specific gravity, $\rho p$, of microspheres was determined with the liquid substitution method (Archimedean method) with isopropyl alcohol in an atmosphere at 25 degree. C. and 50% RH (relative humidity).

Specifically, an empty 100-cc measuring flask was dried and weighed ($WB_1$). Isopropyl alcohol was poured into the weighed measuring flask accurately to form meniscus, and the measuring flask filled with isopropyl alcohol was weighed ($WB_2$).

Then the 100-cc measuring flask was emptied, dried, and weighed ($WS_1$). About 50 cc of heat-expanded microspheres were filled into the weighed measuring flask, and the measuring flask filled with the heat-expanded microspheres was weighed ($WS_2$). Then isopropyl alcohol was poured into the measuring flask filled with the heat-expanded microspheres accurately to form meniscus without taking bubbles into the isopropyl alcohol, and the flask filled with the microspheres and isopropyl alcohol was weighed ($WS_3$). The values, $WB_1$, $WB_2$, $WS_1$, $WS_2$, and $WS_3$, were introduced into the following expression to calculate the true specific gravity ($\rho p$) of the heat-expanded microspheres.

$$\rho p = \{(WS_2 - WS_1) \times (WB_2 - WB_1)/100\} / \{(WB_2 - WB_1) - (WS_3 - WS_2)\}$$

[Determination of Ratio of Microspheres Having a True Specific Gravity of 0.79 g/cc or Higher at 25 Degree. C. (Sedimentable Component Ratio)]

Heat-expanded microspheres were added to isopropyl alcohol having a true specific gravity of 0.79 at 25 degree. C. to be subjected to gravity separation, where microspheres are separated by the standard specific gravity, 0.79, into those floating on isopropyl alcohol being estimated to have a true specific gravity lower than 0.79 g/cc, and those sedimenting into isopropyl alcohol being estimated to have a true specific gravity not lower than 0.79 g/cc. The microspheres sedimented into isopropyl alcohol were quantified to determine the ratio (weight percent) of sedimentable component.

Specifically, 10 g of heat-expanded microspheres was packed in a 1-liter separation funnel, 700 cc of isopropyl alcohol was poured into the separation funnel to be mixed for about 3 minutes, and then the funnel was held motion less. Then each of the portions floating on and sedimenting in isopropyl alcohol was fractionated and taken up. The sedimented portion was dried and weighed as Wd (g). The sedimentable component ratio was calculated by the following expression.

$$\text{Sedimentable component ratio(weight percent)} = Wd/10 \times 100$$

[Determination of Bulk Specific Gravity]

A stainless cup having 50 mm inside diameter and 100 cc unobstructed capacity was weighed. (Wb) Then a tube for stopping powder flow was fixed at the top of the stainless cup, and 200 cc of a sample (heat-expanded microcapsules) was filled in the cup. Then the sample in the cup was tapped 180 times, and the tube was removed. The sample in the cup was leveled at the top of the cup with a blade, and the stainless cup filled with the sample was weighed (Wa). The tapping was carried out 180 times at a rate of 1 time/sec by lifting the cup 15 mm high. The bulk specific gravity, $\rho b$ (g/cc), was calculated by the following expression.

$$\rho b (g/cc) = (Wa - Wb)/100$$

[Packing Efficiency]

The packing efficiency was evaluated by the void fraction, $\epsilon$, calculated by the following expression:

$$\epsilon = 1 - \rho b / \rho p$$

where: $\epsilon$ is void fraction, $\rho b$ is the bulk specific gravity of a sample (heat-expanded microspheres) (g/cc), and $\rho p$ is the true specific gravity of a sample (heat-expanded microspheres) (g/cc).

[Determination of Moisture Content of Heat-Expandable Microspheres]

The moisture content was determined with a Karl Fischer moisture meter (MKA-510N, produced by Kyoto Electronics Manufacturing Co., Ltd.).

[Determination of Ratio of Blowing Agent Encapsulated in Heat-Expandable Microspheres]

1.0 g of heat-expandable microspheres was placed in a stainless steel evaporating dish 15 mm deep and 80 mm in diameter, and weighed ($W_1$). Then 30 ml of acetonitrile was added to disperse the microspheres uniformly. After being left for 30 minutes at room temperature, the microspheres were dried at 120 degree. C. for 2 hours, and the dry weight ($W_2$) was determined. The ratio of encapsulated blowing agent was calculated by the following expression.

$$\text{Ratio of encapsulated blowing agent(weight percent)} = (W1 - W2)(g)/1.0(g) \times 100 - (\text{moisture content})\,(\text{weight percent})$$

(The moisture content in the expression was calculated as described above.)

[Retention]

The retention of an encapsulated blowing agent is the percentage of the ratio of an encapsulated blowing agent after expansion ($G_2$) to the ratio of an encapsulated blowing agent before expansion ($G_1$), and calculated by the following expression.

$$\text{Retention(percent)} = G_2/G_1 \times 100$$

[Determination of (Re-)Expansion Initiating Temperature And Maximum (Re-)Expanding Temperature]

Those properties were determined with DMA (DMA Q800, produced by TA Instruments). In an aluminum cup 4.8 mm deep and 6.0 mm in diameter, 0.5 mg of heat-expandable microspheres (or heat-expanded microspheres) were placed, and an aluminum lid 0.1 mm thick and 5.6 mm in diameter was placed on the cup to prepare a sample. The sample was subjected to a pressure of 0.01 N with a compression unit, and the height of the sample (H1) was measured. The sample was then heated in the temperature range from 20 to 300 degree. C. elevating at a rate of 10 degree. C./min, being subjected to the pressure of 0.01 N with the compression unit, and the vertical change of the position of the compression unit was determined. The temperature at which the compression unit started to change its position to the positive direction was determined as a (re-)expansion initiating temperature, and the temperature at which the compression unit indicated the greatest change ($H_2$) was determined as the maximum (re-) expanding temperature. A (re-)expansion coefficient at the maximum (re-)expanding temperature, E, was calculated by the following expression.

$$E(\text{percent}) = H_2/H_1 \times 100$$

[Determination of Ratio of Aggregated Microspheres]

The existence of aggregated microspheres was identified visually through electron microscope.

At first, the average particle size, R, of heat-expanded microspheres was determined. Then the ratio of aggregated microspheres contained in the whole of the heat-expanded microspheres was calculated from the amount of aggregated microspheres remaining after screening the heat-expanded microspheres with a sieve of about 2.0 R opening, the tolerance of which is plus/minus 0.05 R. If a sieve of 2.0 R opening is not available, the ratio of remaining microspheres after screening with a sieve of an opening within the range from 1.8 R to 2.0 R (except 2.0 R) and the ratio of the remaining microspheres after screening with a sieve of an opening within the range from 2.0 R to 2.2 R (except 2.0 R) may be proportionally distributed and calculated to determine an amount equal to the ratio of the microspheres to remain after screening with a sieve of 2.0 R opening. For selecting each of sieves with an opening within the range from 1.8 R to 2.0 R (except 2.0 R) and from 2.0 R to 2.2 R (except 2.0 R), a sieve having an opening as near to 2.0 R as possible should be selected. The amount of a sample screened with a sieve should be 1 liter or more.

[Determination of Repeated-Compression Durability]

In an aluminum cup 4.8 mm deep and 6 mm in diameter (having an inside diameter of 5.65 mm), 2.00 mg of heat-expanded microspheres were placed, and an aluminum lid 0.1 mm thick and 5.6 mm in diameter was placed on the heat-expanded microspheres to prepare a sample. Then the sample was tested with DMA (DMA Q800, produced by TA Instruments), where the sample was compressed on its aluminum lid with a compression unit at 25 degree. C. being subjected to a pressure of 2.5 N, and the thickness of the layer of the heat-expanded hollow microspheres, $L_1$, was determined. Then the pressure was raised from 2.5 N to 18 N at a rate of 10 N/min, followed with the reduction of the pressure from 18 N to 2.5 N at a rate of 10 N/min. The pressure raising and reducing operation were repeated 7 times, and the thickness of the layer of the heat-expanded hollow microspheres, $L_2$, was determined. Then the ratio between $L_1$ and $L_2$, the thickness of the layers of the heat-expanded hollow microspheres, was calculated into repeated-compression durability by the following expression.

Repeated-compression durability(percent)= $(L_2/L_1) \times 100$

Example 1

Figure 2:
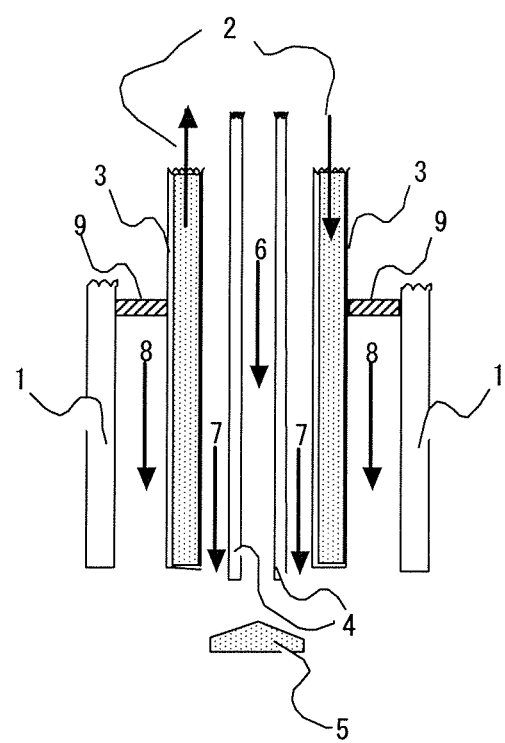
FIG. 2: A diagram of an example of the expanding device of the manufacturing equipment employed in a production process of the present invention.

Heat-expanded microspheres were produced by heating and expanding MATSUMOTO MICROSPHERE F-100D (produced by Matsumoto Yushi-Seiyaku Co., Ltd., comprising nitrile copolymer as thermoplastic resin shell, with an average particle size of 25 micrometer) with the manufacturing equipment equipped with an expanding device (with a metal mesh of No. 30 mesh as a turbulent flow generating member) shown in FIG. 2. Before the dispersed heat-expandable microspheres contact to hot gas flow 8, the temperature at each of the points in the hot gas flow 8 (which were eight points locating underneath the hot gas nozzle in almost similar distance from the nozzle and being arranged in almost similar distance from adjacent points) was determined, and the difference in the temperature (between the highest and lowest temperature values) was 30 degree. C.

The expanding conditions were controlled into 0.10 kg/h for raw material feeding rate, 0.03 $m^3$/min for the flow rate of gas containing dispersed raw material, 0.5 $m^3$/min for the flow rate of hot gas, and 180 degree. C. for hot gas temperature. The property of the resultant expanded micro spheres was determined and shown in Table 1.

Example 2

Figure 3:
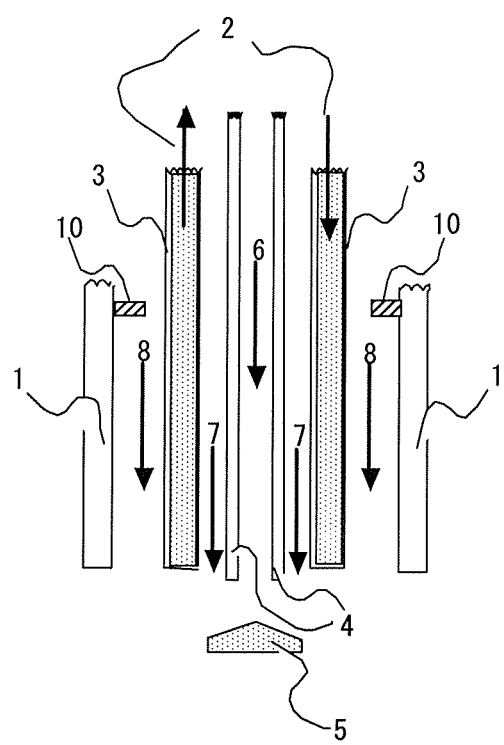
FIG. 3: A diagram of another example of the expanding device of the manufacturing equipment employed in a production process of the present invention.

Heat-expanded microspheres were produced by heating and expanding the microspheres in the same manner as in Example 1, except that the manufacturing equipment was replaced with an equipment equipped with the expanding device (with a ring as a turbulent flow generating member) shown in FIG. 3. The difference in the temperature was 5 degree. C.

The property of the resultant expanded microspheres was determined and shown in Table 1.

Example 3

Heat-expanded microspheres were produced by heating and expanding the microspheres in the same manner as in Example 1, except that the manufacturing equipment was replaced with an equipment equipped with the expanding device (with an expansion chamber as a turbulent flow generating member) shown in FIG. 4. The difference in the temperature was 1 degree. C.

The property of the resultant expanded microspheres was determined and shown in Table 1.

Comparative Example 1

Heat-expanded microspheres were produced by heating and expanding the microspheres in the same manner as in Example 1, except that the manufacturing equipment was replaced with an equipment equipped with the expanding device (without turbulent flow generating member) shown in FIG. 1 (*a*). The difference in the temperature was 50 degree. C.

The property of the resultant expanded microspheres was determined and shown in Table 1.

Comparative Example 2

Heat-expanded microspheres were produced in the same manner as in Example 1 except that a circulation type dryer was used as a manufacturing equipment. Specifically, 100 g of MATSUMOTO MICROSPHERE F-100D was weighed, spread on detaching paper in an area about 100 $cm^2$, and heated in an air circulation dryer at 180 degree. C. for 15 minutes to be processed into expanded microspheres.

The property of the resultant expanded microspheres was determined and shown in Table 1.

Example 4

MATSUMOTO MICROSPHERE F-100D, used in Example 1 and calcium stearate (AFCO CHEM CA-ST fine powder, with an average particle size of 2.0 micrometer, supplied by Adeca Fine Chemical) were blended in 9:1 weight ratio and uniformly mixed with a Super Mixer (manufactured by Kawata MFG Co., Ltd.) to produce heat-expandable microspheres coated with calcium stearate on their outer surface. The resultant heat-expandable microspheres were named as Trial product 1.

Heat-expanded microspheres were produced in the same manner as in Example 3 except that Trial product 1 was heated and expanded instead of MATSUMOTO MICROSPHERE F-100D.

The property of the resultant expanded microspheres was determined and shown in Table 1.

TABLE 1

|  | Example 1 | Example 2 | Example 3 | Comp. example 1 | Comp. example 2 | Example 4 |
|---|---|---|---|---|---|---|
| Raw material | MATSUMOTO MICROSPHERE F-100D |  |  |  |  | Trial product 1 |
| Turbulent flow generating member | No. 30 metal mesh | Ring | Expansion chamber | none | — | Expansion chamber |
| Temperature difference (degree. C.) | 30 | 5 | 1 | 50 | — | 1 |
| Diagram or expansion device | FIG. 2 | FIG. 3 | FIG. 4 | FIG. 1(a) | — | FIG. 4 |
| Average particle size (micrometer) | 96 | 95 | 95 | 97 | 96 | 95 |
| Void fraction | 0.63 | 0.51 | 0.37 | 0.75 | 0.86 | 0.44 |
| True specific gravity | 0.028 | 0.029 | 0.029 | 0.028 | 0.026 | 0.031 |
| Repeated-compression durability (%) | 80 | 85 | 89 | 70 | 55 | 91 |
| Ratio of sedimentable portion (wt. %) | 0 | 0 | 0 | 0 | 0 | 0 |
| Opening of sieve 1 (micrometer)/ratio of aggregated microspheres (wt. %) | 175/0 | 175/0 | 175/0 | 175/0 | 175/27 | 175/0 |
| Opening of sieve 2 (micrometer)/ratio of aggregated microspheres (wt. %) | 210/0 | 210/0 | 210/0 | 210/0 | 210/19 | 210/0 |

Example 5

(Production of Trial Product 2)

An aqueous phase was prepared by adding 150 g of sodium chloride, 3.0 g of an adipic acid-diethanolamine condensate, 20 g of colloidal silica (20-percent concentration), and 0.15 g of sodium nitrite to 500 g of deionized water, and by homogenizing the mixture with agitation.

An oily phase was prepared by mixing 180 g of acrylonitrile, 45 g of methacrylonitrile, 75 g of methacrylic acid, 1.2 g of trimethylolpropane trimethacrylate, 2.0 g of azobisisobutyronitrile, and 150 g of $C_3F_7OCH_3$, and by agitating to dissolve the ingredients.

Then the aqueous phase and the oily phase were mixed preliminarily with a homogenizer at 3,000 rpm for 2 minutes, and then agitated at 10,000 rpm for 2 minutes to prepare a suspension. Then, the suspension was transferred into a reactor, purged with nitrogen, and polymerized at 61 degree. C. for 20 hours with agitation. The polymerization product was filtered and dried. The resultant microspheres had an average particle size of 25 micrometer, a CV or coefficient of variation of 24 percent, an expansion initiating temperature of 143 degree. C., and the maximum expanding temperature of 205 degree. C.

The ratio of encapsulated blowing agent in Trial product 2 was determined into 31.8 weight percent.

Trial product 2 was exposed to a source of ignition, but the product did not burn.

(Heat-Expansion of Trial Product 2)

Then heat-expanded microspheres were produced by heating and expanding microspheres in the same manner as in Example 1, except that the raw material, heat-expandable microspheres, was the Trial product 2 mentioned above and the hot gas temperature was settled at 240 degree. C. Before the dispersed heat-expandable microspheres contact to hot gas flow 8, the temperature at each of the points in the hot gas flow 8 almost locating on a plane vertical to the direction of the hot gas flow 8 (the eight points which were located underneath the hot gas nozzle in almost the same distance from the downstream position of the hot gas nozzle and in almost the same distance from adjacent points) was determined, and the difference in the temperature (between the highest and lowest temperature values) was 30 degree. C.

The property of the resultant expanded microspheres was determined and shown in Table 2.

Example 6

Heat-expanded microspheres were produced in the same manner as in Example 5, except that the manufacturing equipment was replaced with the equipment equipped with the expanding device (with a ring as a turbulent flow generating member) shown in FIG. 3. The difference in the temperature was 5 degree. C.

The property of the resultant expanded microspheres was determined and shown in Table 2.

Example 7

Heat-expanded microspheres were produced in the same manner as in Example 5, except that the manufacturing equipment was replaced with the equipment equipped with the expanding device (with an expansion chamber as a turbulent flow generating member) shown in FIG. 4. The difference in the temperature was 1 degree. C.

The property of the resultant expanded microspheres was determined and shown in Table 2.

Comparative Example 3

Heat-expanded microspheres were produced in the same manner as in Example 5, except that the manufacturing equipment was replaced with the equipment equipped with the expanding device (with no turbulent flow generating member) shown in FIG. 1 (*a*). The difference in the temperature was 50 degree. C.

The property of the resultant expanded microspheres was determined and shown in Table 2.

Example 8

The Trial product 2 and carbon black (KETJENBLACK ECP600JD, with an average particle size of 34 nm, supplied by Lion Corporation) were blended in 9:1 weight ratio and uniformly mixed with a Super Mixer (manufactured by Kawata MFG Co., Ltd.) to produce heat-expandable microspheres coated with carbon black on their outer surface. The resultant heat-expandable microspheres were named as Trial product 3.

Heat-expanded microspheres were produced by heating and expanding microspheres in the same manner as in Example 6, except that the Trial product 2 was replaced with the Trial product 3.

The property of the resultant expanded microspheres was determined and shown in Table 2.

TABLE 2

|  | Example 5 | Example 6 | Example 7 | Comp. example 3 | Example 8 |
| --- | --- | --- | --- | --- | --- |
| Raw material |  | Trial product 2 |  |  | Trial product 3 |
| Turbulent flow generating member | No. 30 metal mesh | Ring | Expansion chamber | none | Ring |
| Temperature difference (degree. C.) | 30 | 5 | 1 | 50 | 5 |
| Diagram or expansion device | FIG. 2 | FIG. 3 | FIG. 4 | FIG. 1(a) | FIG. 3 |
| Average particle size (micrometer) | 86 | 85 | 85 | 86 | 84 |
| Void fraction | 0.54 | 0.48 | 0.33 | 0.72 | 0.41 |
| True specific gravity | 0.031 | 0.032 | 0.032 | 0.031 | 0.036 |
| Repeated-compression durability (%) | 76 | 81 | 85 | 65 | 88 |
| Ratio of sedimentable portion (wt. %) | 1.5 | 1.3 | 1.4 | 1.5 | 1.3 |
| Opening of sieve 1 (micrometer)/ratio of aggregated microspheres (wt. %) | 175/0 | 175/0 | 175/0 | 175/0 | 175/0 |
| Opening of sieve 2 (micrometer)/ratio of aggregated microspheres (wt. %) | — | — | — | — | — |

What is claimed is:

1. A plurality of heat-expanded microspheres, each of the heat-expanded microspheres comprising
   a plurality of heat expandable microspheres that prior to heating include a shell of thermoplastic resin and a blowing agent encapsulated therein having a boiling point not higher than the softening point of the thermoplastic resin, the plurality of heat expandable microspheres having an average particle size from 1 to 100 micrometer, and
   after heating the heat-expanded microspheres have a void fraction not higher than 0.70, where the void fraction is a physical property value for evaluating packing efficiency of a bulk volume of the heat-expanded microspheres, the void fraction representing the ratio of void in the bulk volume of the heat-expanded microspheres, the heat-expanded microspheres having a repeated-compression durability not lower than 75 percent wherein the heat-expanded microspheres contain aggregated microspheres in an amount not higher than 5 weight percent and contain microspheres having a true specific gravity not lower than 0.79 g/cc at 25 degree. C. in an amount not higher than 5 weight percent.

2. The plurality of heat-expanded microspheres according to claim 1, further comprising
   a particulate filler adhering to the outer surface of the shell thereof, the particulate filler having an average particle size not greater than one tenth of the average particle size of the heat-expandable microspheres without the particulate filler adhered to the surface thereof.

3. The plurality of heat-expanded microspheres according to claim 1, wherein
   the blowing agent contains a $C_{2-10}$ fluorine compound having an ether structure and containing no chlorine and bromine atoms.

4. The plurality of heat-expanded microspheres according to claim 1, wherein
   the thermoplastic resin is produced by polymerizing a monomer mixture consisting essentially of a nitrile monomer and the weight ratio of the nitrile monomer is not lower than 20 weight percent of the monomer mixture.

5. The plurality of heat-expanded microspheres according to claim 4, wherein
   the thermoplastic resin is produced by polymerizing a monomer mixture consisting essentially of a nitrile monomer and a monomer having a carboxyl group, the weight ratio of the nitrile monomer ranges from 20 to 80 weight percent of the monomer mixture, and the weight ratio of the monomer having a carboxyl group ranges from 80 to 20 weight percent.

6. The plurality of heat-expanded microspheres according to claim 2, wherein
   the blowing agent contains a $C_{2-10}$ fluorine compound having an ether structure and containing no chlorine and bromine atoms.

7. The plurality of heat-expanded microspheres according to claim 2, wherein
   the thermoplastic resin is produced by polymerizing a monomer mixture consisting essentially of a nitrile monomer and the weight ratio of the nitrile monomer is not lower than 20 weight percent of the monomer mixture.

8. The plurality of heat-expanded microspheres according to claim 3, wherein
   the thermoplastic resin is produced by polymerizing a monomer mixture consisting essentially of a nitrile monomer and the weight ratio of the nitrile monomer is not lower than 20 weight percent of the monomer mixture.

* * * * *